United States Patent [19]

Iida

[11] Patent Number: 5,008,803
[45] Date of Patent: Apr. 16, 1991

[54] APPARATUS FOR CONTROLLING AN AIR FLOW OF AN AUTOMOBILE AIR-CONDITIONER

[75] Inventor: Katsumi Iida, Konan, Japan

[73] Assignee: Diesel Kiki Co., Ltd., Tokyo, Japan

[21] Appl. No.: 338,931

[22] Filed: Apr. 11, 1989

[30] Foreign Application Priority Data
May 16, 1988 [JP] Japan .................. 63-118882

[51] Int. Cl.$^5$ ............... F25B 29/00; G05B 13/02
[52] U.S. Cl. .................. 364/148; 165/16; 165/28
[58] Field of Search ........... 98/2.01, 2.11; 165/2, 165/16, 28, 30; 237/5; 364/140, 148, 557

[56] References Cited

U.S. PATENT DOCUMENTS

| | | | |
|---|---|---|---|
| 4,289,195 | 9/1981 | Bellot et al. | 165/16 X |
| 4,311,188 | 1/1982 | Kojima et al. | 165/2 |
| 4,416,324 | 11/1983 | Sutoh et al. | 165/16 X |
| 4,498,309 | 2/1985 | Kobayashi et al. | 98/2.01 X |
| 4,602,675 | 7/1986 | Kobayashi | 165/43 X |
| 4,738,396 | 4/1988 | Doi et al. | 165/16 X |

Primary Examiner—Parshotam S. Lall
Assistant Examiner—Edward R. Cosimano
Attorney, Agent, or Firm—Wenderoth, Lind & Ponack

[57] ABSTRACT

An air flow control apparatus of an automobile air-conditioner is capable of controlling the air flow of a blower according to the thermal load within the passenger compartment. The air flow control apparatus limits the maximum air flow of the blower to a predetermined low level based on an external environmental condition such as, for example, the outside air temperature when the temperature of an upper part of the vehicle compartment is lower than a predetermined value.

3 Claims, 3 Drawing Sheets

APPARATUS FOR CONTROLLING AN AIR FLOW OF AN AUTOMOBILE AIR-CONDITIONER

BACKGROUND OF THE INVENTION

1. Field of the Invention:

The present invention relates to an apparatus for automatically controlling the amount of air flow of an automobile air-conditioner when the air-conditioner is operating in the cooling mode.

2. Description of the Related Art:

Japanese Patent Publication No. 62-41127, for example, discloses a coventional air flow control apparatus for automobile air-conditioners. The known control apparatus maintains the air flow of an air-conditioner within a range near the maximum air flow of the air-conditioner immediatelty after the start of operation of the air-conditioner in which instance a large cooling capability is necessary. Thereafter, upon the lapse of a predetermined period of time, the maximum air flow is limited to a certain low level to thereby prevent the air-conditioner from operating at an undue high maximum air flow level for a long period of time.

Since according to the known air flow control, the limitation of the maximum air flow is achieved merely based on a determination as to whether a predetermined period of time has elapsed or not, it is likely that the maximum air flow is limited in spite of the necessity of a large cooling capability, or alternately an excessively strong cooling condition continues even after a desired air-conditioning is provided.

Further, whether a pleasant air-conditioning is obtained or not should preferably be made based on the environment in the vicinity of the head of an occupant which is most sensitive to temperature. In the case of the conventional air flow control apparatus, however, no consideration is given to this environmental factor when the maximum air flow of the air-conditioner is limited.

SUMMARY OF THE INVENTION

It is accordingly an object of the present invention to provide an apparatus for controlling an air flow of automobile air-conditioners, which is capable of limiting the maximum air flow of an air-conditioner while maintaining a pleasant air-conditioning state.

Another object of the present invention is to eliminate or substantially reduce the possibility of generating of an unpleasant air flow noise from a blower of the air-conditioner.

A further object of the present invention is to provide an air flow control apparatus for automobile air-conditioners, which is capable of providing a pleasant air-conditioning state by keeping a well-balanced relation between an air-conditioning state and the amount of blown-off air.

According to the present invention, there is provided an apparatus for controlling an air flow of an air-conditioner for a motor vehicle, comprising: total signal calculation means for calculating a total signal corresponding to a thermal load of the air-conditioner, based on at least a setting temperature of the inside of a compartment of the motor vehicle and a representative temperature of the inside of the vehicle compartment; target air flow calculation means for calculating, based on the total signal, a target air flow to be supplied to the vehicle compartment; external environment detection means for detecting a state of the environment outside of the vehicle compartment which exerts an influence upon an air-conditioning state of the vehicle compartment; maximum air flow limit calculation means for calculating a limit value for the maximum air flow to be supplied to the vehicle compartment, according to an output from the external environment detection means; upper-part temperature detection means for detecting the temperature at an upper part of the vehicle compartment; control air flow determination means for establishing a control mode in which the air flow of the air-conditioner is regulated to the target air flow until the temperature at the upper part of the vehicle compartment becomes lower than a predetermined temperature, and for substituting the target air flow with said limit value calculated by the maximum air flow limit calculation means to thereby establish a control mode in which the air flow of the air-conditioner is regulated to the limit value once the temperature of the upper portion of the vehicle compartment has become lower than the predetermined temperature; and control means for controlling the rotational speed of a blower of the air-conditioner according to the control mode established by the air flow determination means.

With this arrangement, the maximum air flow is not limited when the temperature of the upper part of the vehicle compartment is higher than the predetermined value. The limitation of the maximum air flow takes place when this upper-part temperature becomes lower than the predetermined temperature, and the maximum air flow is lowered to the limit value in conformity with the external environment. It is therefore possible to prevent an undue supply of the maximum air flow for a long period of time which would otherwise exert an unpleasant feeling upon the head of an occupant. Likewise, an undue drop of air flow does not occur before the upper-part temperature reaches a desired value. Accordingly, the air-conditioner can be operated at an adequate cooling capability which is equivalent to the standing thermal load.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The present invention will be described herein below in greater detail with reference to an embodiment shown in the accompanying drawings.

Figure 1:
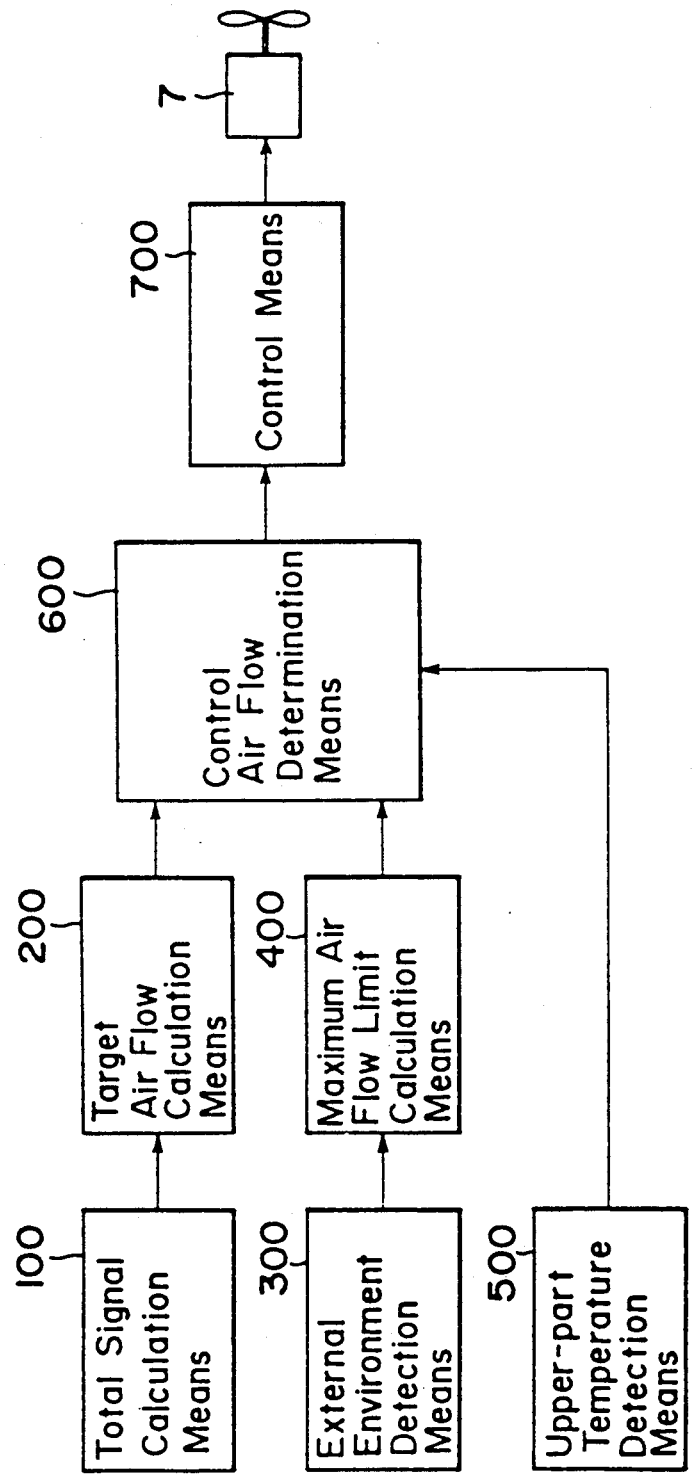
FIG. 1 is a block diagram of an air flow control apparatus for an automobile air-conditioner according to the present invention.

FIG. 1 shows the general structure of apparatus for controlling an air flow according to the present invention. The apparatus for controlling the air flow generally comprises: total signal calculation means 100 for calculating a total signal corresponding to a thermal load of the air-conditioner, based on at least a setting temperature of the inside of a compartment of the motor vehicle and a representative temperature of the inside of the vehicle compartment; target air flow calculation means 200 for calculating, based on said total signal, a target air flow to be supplied to the vehicle compartment; external environment detection means 300 for detecting a state of the environment outside of the vehicle compartment which exerts an influence upon an air-conditioning state of the vehicle compartment; maximum air flow limit calculation means 400 for calculating a limit value for the maximum air flow to be supplied to the vehicle compartment, according to an output from said external environment detection means 300; upper-part temperature detection means 500 for detecting the temperature at an upper part of the vehicle compartment; control air flow determination means 600 for establishing a control mode in which an air flow of the air-conditioner is regulated to said target air flow until said temperature at the upper part of the vehicle compartment becomes lower than a predetermined temperature, and for substituting the target air flow with said limit value calculated by said maximum air flow limit calculation means 400 to thereby establish a control mode in which the air flow of the air-conditioner is regulated to said limit value once said temperature of the upper portion of the vehicle compartment has become lower than the predetermined temperature; and control means 700 for controlling the rotational speed of a blower 7 of the air-conditioner according to the control mode established by said control air flow determination means 600.

Figure 2:
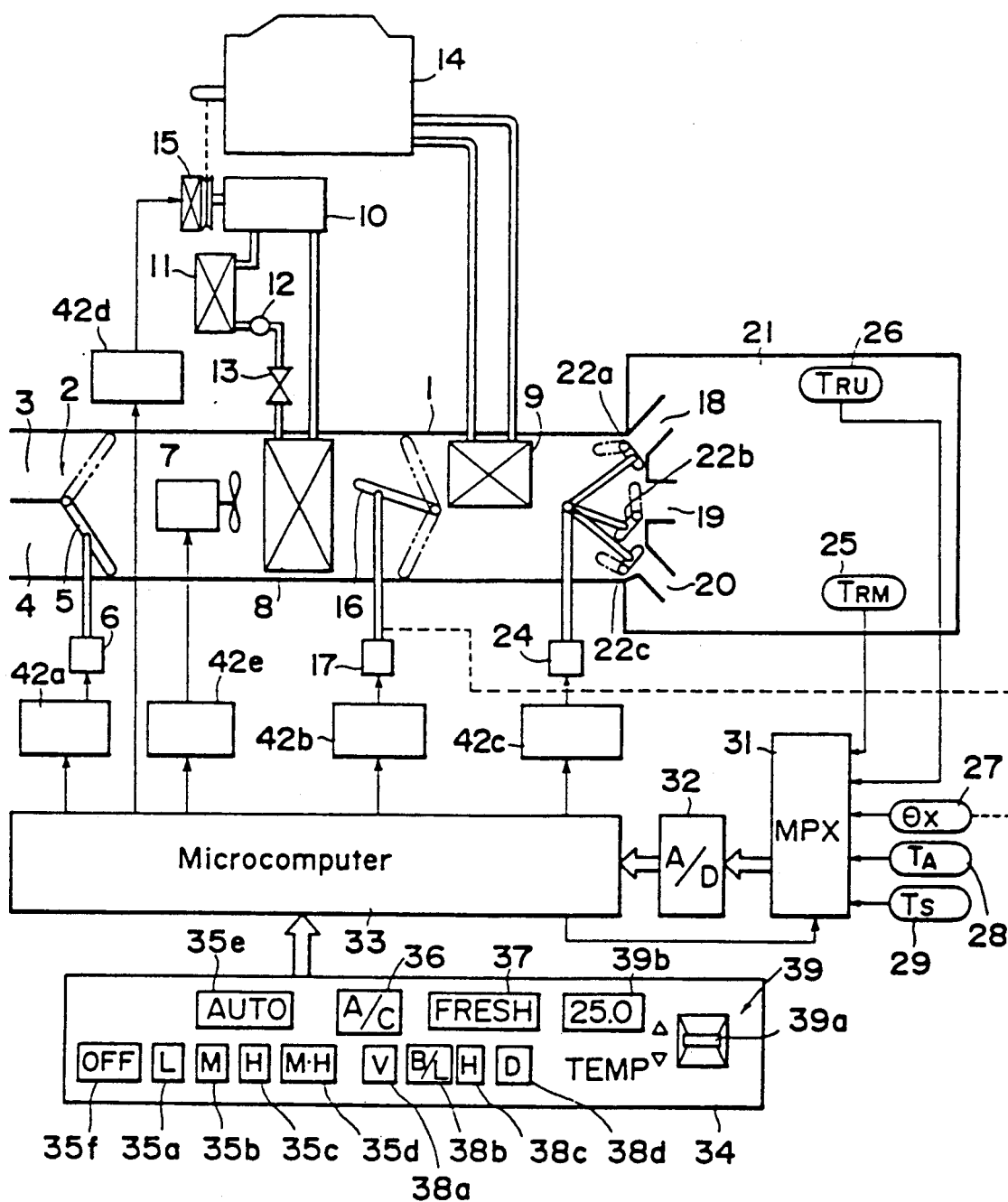
FIG. 2 is a schematic diagram of an automobile air-conditioner in which the air flow control apparatus is incorporated.

As shown in FIG. 2, an automobile air-conditioner includes an intake door changeover device 2 at the upstream end thereof. The intake door changeover device 2 includes a selecting door 5 disposed at the junction between a recirculated air inlet 3 and an outside air inlet 4 that are provided in a bifurcated fashion. The selecting door 5 is operatively connected to an actuator 6 and is driven by the latter to select one of the inlets 3, 4 for allowing the recirculated air or the outside air to be drawn into the duct 1.

A blower 7 is disposed in the duct 1 immediately downstream of the changeover device 2 to force the air to flow downstream through the duct 1. The duct 1 also includes an evaporator 8 and a heater core 9 disposed downstream of the blower 7 in that order.

The evaporator 8 is connected in a fluid circuit with a compressor 10, a condenser 11, a receiver tank 12, and an expansion valve 13 so as to constitute jointly therewith a refrigeration system achieving a refrigeration cycle. The compressor 10 includes an electromagnetic clutch 15 for selectively connecting the compressor 10 to an engine 14 of a motor vehicle. The electromagnetic clutch 15 is engaged and disengaged to undertake an on-off control operation of the compressor 10. The heater core 9 serves to heat the air passing therethrough by the heat taken up from engine cooling water recirculating through the heater core 9. An air-mix door 16 is disposed between the evaporator 8 and the heater core 9 and is operatively connected to an actuator 17. The opening $\theta x$ of the air-mix door 16 is regulated by the actuator 17 for adjustably varying the ratio of the amount of air flowing directly through the heater core 9 and the amount of air bypassing the heater core 9, so that the temperature of air to be discharged or blown-off from the duct 1 is regulated to at a desired value.

The duct 1 has at its downstream end a defroster outlet 18, a vent outlet 19 and a heat outlet 20 that are provided in a branched fashion and are all open to a vehicle compartment 21. Three mode doors 22a, 22b, 22c are disposed adjacent to the respective outlets 18–20 to open or block the outlets 18–20. The operation of the mode doors 22a–22c is controlled by an actuator 24 for selecting a desired mode of operation of the air-conditioner.

A vehicle compartment temperature sensor 25 is disposed on a floor, an instrument panel or the like for detecting a representative temperature TRM in the vehicle compartment 21. An upper-part temperature sensor 26, constituting upper-part temperature detecting means 500, is disposed on the inside surface of a roof panel, for example, for detecting the temperature TRU of an upper part of the vehicle compartment 21 adjacent to the head of an occupant of the motor vehicle. The opening $\theta x$ of the air-mix door 16 is detected by an opening sensor 27 which comprises, for example, a potentiometer. Designated by reference character 28 is an outside air temperature sensor, constituting a preferred form of the external environment detection means 300, for detecting the temperature TA of the air outside the vehicle compartment 21. Reference character 29 denotes a sunlit portion temperature sensor for detecting the temperature Ts of a vehicle compartment portion exposed to the incident light of the sun (the radiant heat of the sun). Output signals from the respective sensors 25 through 29 are inputted through a multiplexer 31 into an A/D converter 32 in the order selected by the multiplexer 31. After having been digitalized by the A/D converter 32, the output signals are delivered to a microcomputer 33.

The microcomputer 33 is also supplied with the output signals from an instrument panel 34. The instrument panel 34 is provided with a series of manual switches 35a–35d for selectively changing the rotational speed of the blower 7 between a succession of low (LOW), medium (MED), high (HI) and maximum high (MAX HI) levels, an automatic switch (AUTO) 35e for automatically controlling the rotational speed of the blower 7, an off switch (OFF) 35f for stopping the operation of the blower 7, a start switch (A/C) 36 for starting the compressor 10, a changeover switch 37 for selecting which of the recirculated air or the outside air is to be introduced into the duct 1, four mode switches 38a–38d for selecting a discharge mode of the blown-off air, and a temperature setter 39.

The temperature setter 39 comprises an up-down switch 39a and a display unit 39b associated therewith. The up-down switch 39a is actuated to vary the setting (desired) temperature (Tset) within a predetermined range, the setting temperature (Tset) being indicated on the display unit 39b.

The temperature setter 39 may be of the type having a slidable temperature setting lever manually actuated to adjustably set the desired temperature.

The microcomputer 33 is of the conventional type per se and comprises a central processing unit (CPU), a read only memory (ROM), random access memory (RAM) and an input/output port (I/O), none of which are shown. The microcomputer 33 serves to calculate control signals based on the various input signals set forth above and deliver them through respective driver circuits 42a–42e to the actuators 6, 17, 24, the compressor 10 and a motor of the blower 7 for controlling the operation of the various doors 5, 16, 22a–22c, the on-off operation of the compressor 10 and the rotation of the blower motor. As is clear from FIG. 1, the drive circuit 42e constitutes control means 700.

Figure 3:
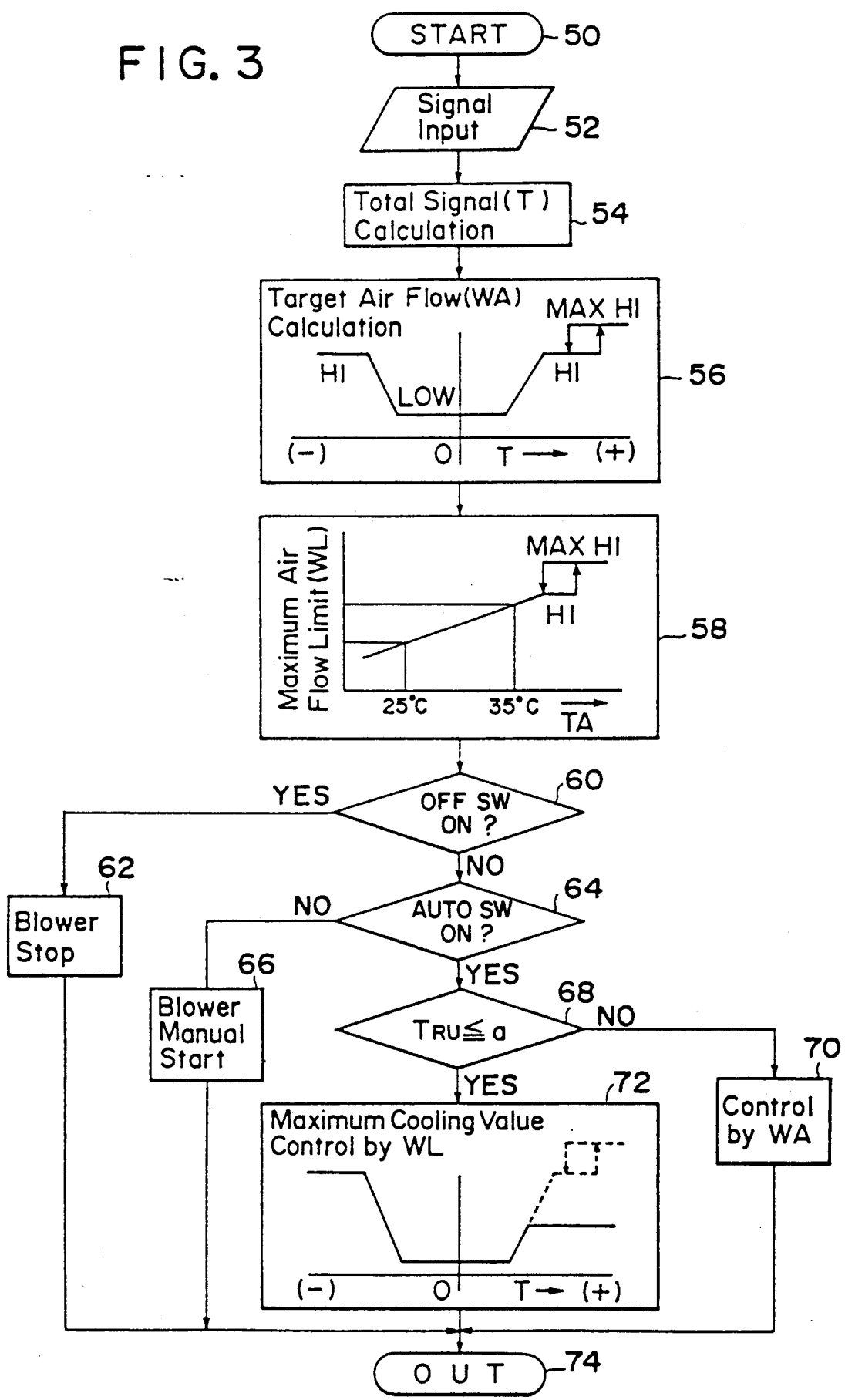
FIG. 3 is a flowchart of a control routine in a microcomputer incorporated in the air flow control apparatus.

The operation of the microcomputer 33 will be described below with reference to a flowchart shown in FIG. 3 in which a control routine of the control operation of the blower 7 is illustrated.

The control routine of the microcomputer 33 starts in a step 50 in accordance with a program stored in the microcomputer 33. In the next step 52, various signals including the upper-part temperature TRU are inputted from the corresponding sensors 25-29 through the multiplexer 31 and the A/D converter 32 into the microcomputer 33 and then they are stored, respectively, in prescribed areas of the RAM. Thereafter, based on the thus-inputted signals, a total signal T corresponding to a total thermal load is calculated, by total signal calculation means 100 of the microcomputer, in a step 54 in accordance with the following equation.

$$T = K1 \cdot 19 \, TRM + K2 \cdot TA + K3 \cdot Ts - K4 \cdot Tset + C$$

where K1, K2, K3, K4 and C are constants.

When the total signal T is positive (+), this means that the control is to be achieved in the cooling mode. The total signal T becomes large as the thermal load for cooling is increased. Conversely, when the total signal T is negative (−), then the control is to be achieved in the heating operation mode. The total signal becomes small as the thermal load for heating is increased.

After the total signal T has been calculated, the control routine proceeds to step 56 in which a desired or target air flow WA is calculated in accordance with a predetermined standard pattern by the target air flow calculation means 200 of the microcomputer. The standard pattern is designed such that the target air flow WA takes a large value when the total signal T deviates to a large degree from the referrence value "0" toward the positive (+) side or the negative (−) side as the thermal load increases.

Thereafter, a limit value WL for the maximum air flow in the cooling operation is calculated by maximum air flow limit calculation means 400 of the microcomputer, in a step 58 based on the state of the external environment such as, for example, the outside air temperature TA which exerts an influence upon the air-conditioned state of the vehicle compartment 21. In this calculation, a predetermined pattern is used. The pattern is designed such that when the outside air temperature TA is high and hence a large cooling capability is needed, the maximum air flow of the air-conditioner is not substantially influenced and therefore a rapid cooling of the vehicle compartment 31 is effected. Conversely, when the outside air temperature TA is low and hence a small cooling capability is needed, the limit value WL for the maximum air flow is reduced in direct proportion to the outside air temperature TA. In the illustrated embodiment, the outside air temperature TA is used as an external environment. The present invention is not limited to the illustrated embodiment but it is possible according to the invention to use the sunlit portion temperature Ts as an indicator of the state of the external environment.

Then the control routine proceeds to step 60 in which a judgment (OFF SW ON?) is made as to whether the off switch 35f on the instrument panel 34 is actuated. When the judgment indicates the ON state of this switch (OFF) 35f, then the control routine proceeds to a step 62 in which the operation of the blower 7 is stopped. Conversely, when the judgment made in step 60 indicates the OFF state of the switch (OFF) 35f, this means that the the blower 7 is operating. In the latter case, the routine proceeds to step 64 in which, another judgment (AUTO SW ON?) is made as to whether the automatic switch (AUTO) 35e is actuated. When the automatic switch (AUTO) 35e is judged as being in the OFF state, then the control routine proceeds to step 66 in which a manual control of the blower 7 is carried out.

On the other hand, when the judgment in the step 64 indicates the ON state of the automatic switch (AUTO) 35e, then the control proceeds to step 68 in which a judgment is made as to whether the upper-part temperature is higher than a predetermined temperature a. The temperature a is a reference temperature based on which a judgment is made as to whether the temperature of air in the vicinity of the head of the occupant has reached to a desired value. The reference temperature is experimentally determined by using the effective temperature, for example.

When the upper-part temperature TRU is judged as being higher than the predetermined value in step 68, this means that cooling of the vehicle compartment 31 has not been effected to the extent that the maximum air flow has to be limited to a low level. Consequently, the air flow is controlled by the target value WA in a step 70 under the mode established by the control air flow determination means 600 of the microcomputer. If the upper-part temperature TRU is judged as being lower than the reference temperature a, this means that a further cooling at the maximum air flow will bring about an undue cooling state of the vehicle compartment 31. Then the control routine proceeds to step 72 in which the maximum air flow for cooling is lowered by the control air flow determination means 600 to a limit value which is determined in step 58. In this instance, when the target air flow WA is smaller than the limit value WL, then the maximum air flow is controlled by the target air flow WA. Alternately, when the target air flow WA is greater than the limit value WL, then the air flow is controlled by the limit value WL.

After the steps 62, 66, 70, 72, the control returns to the start step 50 via a step 74.

In step 68, the judgment on the desired temperature of the air adjacent the head of the occupant is achieved by using the upper-part temperature TRU. This judgment may be made based on the representative temperature TRM on the assumption that the representative temperature TRM has a predetermined correlation with the upper-part temperature TRU.

Obviously, various modifications and variations of the present invention are possible in light of the above teachings. It is therefore to be understood that within the scope of the appended claims the invention may be practiced otherwise than as specifically described.

What is claimed is:

1. An apparatus for controlling air flow in an air-conditioner of a motor vehicle, said apparatus comprising:
    (a) total signal calculation means for calculating a thermal load of the air-conditioner based on at least a desired temperature of the air inside a passenger compartment of the motor vehicle and on a temperature representative of that of the air inside the passenger compartment, and for issuing a total signal indicative of the calculated thermal load;

(b) target air flow calculation means operatively connected to said total signal calculation means for receiving said total signal and for calculating, based on said total signal, a target air flow to be supplied to the passenger compartment;

(c) external environment detection means for detecting an environmental condition outside the passenger compartment which exerts an influence upon an air-conditioning state of the passenger compartment;

(d) maximum air flow limit calculation means operatively connected to said external environment detection means for calculating a limit value for the maximum air flow to be supplied to the passenger compartment, according to the environmental condition detected by said external environment detection means;

(e) upper-part temperature detection means for detecting the temperature of air at an upper part of the passenger compartment;

(f) control air flow determination means operatively connected to said upper-part temperature detecting means for establishing a control mode in which the air flow in the air-conditioner is regulated to said target air flow until temperature of the air at the upper part of the passenger compartment, as detected by said upper-part temperature detecting means, becomes lower than a predetermined temperature, and operatively connected to said maximum air flow limit calculation means for substituting said target air flow with said limit value calculated by said maximum air flow limit calculation means to establish a control mode in which the air flow in the air-conditioner is regulated to said limit value once the temperature of the air at the upper portion of the passenger compartment, as detected by said upper-part temperature detection means, has become lower than the predetermined temperature; and (g) control means for controlling the rotational speed of a blower of the air-conditioner according to the control mode established by said air flow determination means.

2. An apparatus according to claim 1, wherein said external environment detection means comprises an outside air temperature sensor for detecting the temperature of air outside the passenger compartment.

3. An apparatus according to claim 2, wherein said maximum air flow limit calculation means is operative to increase said limit value as the temperature detected by said outside air temperature sensor increases.

* * * * *